(12) United States Patent
Gunness

(10) Patent No.: US 11,344,011 B1
(45) Date of Patent: May 31, 2022

(54) SNAG-FREE FISH HOOK ASSEMBLY, KIT, AND METHOD

(71) Applicant: Clark Robert Gunness, Gallatin, TN (US)

(72) Inventor: Clark Robert Gunness, Gallatin, TN (US)

(*) Notice: Subject to any disclaimer, the term of this patent is extended or adjusted under 35 U.S.C. 154(b) by 0 days.

(21) Appl. No.: 17/490,095

(22) Filed: Sep. 30, 2021

Related U.S. Application Data

(63) Continuation-in-part of application No. 17/180,891, filed on Feb. 22, 2021.

(51) Int. Cl.
| | |
|---|---|
| *A01K 85/02* | (2006.01) |
| *A01K 83/00* | (2006.01) |
| *A01K 85/00* | (2006.01) |
| *A01K 95/00* | (2006.01) |

(52) U.S. Cl.
CPC .......... *A01K 85/024* (2022.02); *A01K 83/066* (2022.02); *A01K 85/02* (2013.01); *A01K 85/1833* (2022.02); *A01K 83/00* (2013.01); *A01K 95/00* (2013.01)

(58) Field of Classification Search
CPC ........ A01K 85/02; A01K 85/00; A01K 83/00; A01K 85/024; A01K 83/066; A01K 85/1833
USPC .. 43/42.39, 42.4, 42.41, 42.42, 42.43, 44.81
See application file for complete search history.

(56) References Cited

U.S. PATENT DOCUMENTS

| | | | | |
|---|---|---|---|---|
| 524,928 | A * | 8/1894 | Bacon | A01K 83/06 43/41 |
| 745,066 | A * | 11/1903 | Koch | A01K 85/00 43/44.81 |
| 1,067,178 | A * | 7/1913 | Lambert | A01K 85/14 43/42.34 |
| 2,576,795 | A * | 11/1951 | Lane | A01K 85/02 43/42.32 |
| 2,866,293 | A * | 12/1958 | Dedrick | A01K 85/00 43/43.13 |
| 2,912,784 | A * | 11/1959 | Carlin | A01K 85/00 43/42.17 |
| 3,078,611 | A * | 2/1963 | Nishioka | A01K 85/08 43/42.05 |
| 3,079,723 | A * | 3/1963 | Roes | A01K 85/00 43/42.26 |
| 3,110,979 | A * | 11/1963 | Woodley | A01K 85/00 43/42.74 |
| 3,191,336 | A * | 6/1965 | Cordell, Jr. | A01K 85/00 43/42.24 |
| 3,245,171 | A * | 4/1966 | Henry | A01K 85/00 43/42.1 |

(Continued)

FOREIGN PATENT DOCUMENTS

| | | | | |
|---|---|---|---|---|
| FR | 937342 | A * | 8/1948 | A01K 85/02 |
| FR | 2097350 | A5 * | 3/1972 | A01K 85/10 |

(Continued)

*Primary Examiner* — Darren W Ark
(74) *Attorney, Agent, or Firm* — Catherin Napjus; Michael Persson; Chisholm, Persson & Ball, PC

(57) ABSTRACT

A fish hook assembly that includes a substantially hemispherical or polyhedron head with an eye and a weed guard extending from the head. A round bead is in physical contact with at least the weed guard so that underwater obstructions that would normally get snagged on the eye and/or weed guard will roll away over the bead.

25 Claims, 7 Drawing Sheets

(56) References Cited

U.S. PATENT DOCUMENTS

| | | | | |
|---|---|---|---|---|
| 3,343,296 | A * | 9/1967 | Davis | A01K 85/00 43/42.28 |
| 3,750,321 | A * | 8/1973 | McClellan | A01K 85/00 43/42.1 |
| 4,450,646 | A * | 5/1984 | Maltese | A01K 95/00 43/43.14 |
| 4,530,180 | A * | 7/1985 | Gwaldacz, Sr | A01K 85/00 43/42.28 |
| 4,596,086 | A * | 6/1986 | Garland | A01K 85/00 43/42.4 |
| 4,747,228 | A * | 5/1988 | Giovengo, Jr. | A01K 85/01 43/42.31 |
| 4,777,758 | A * | 10/1988 | Phillips | A01K 85/00 43/42.09 |
| 4,796,378 | A * | 1/1989 | Krueger | A01K 83/00 43/42.38 |
| 4,864,766 | A * | 9/1989 | Bohn | A01K 85/00 43/42.37 |
| 4,888,909 | A * | 12/1989 | Adams | A01K 85/10 43/42.16 |
| 4,893,430 | A * | 1/1990 | Barfield | A01K 85/00 43/42.24 |
| 4,926,579 | A * | 5/1990 | Jimenez | A01K 85/00 43/42.44 |
| 5,203,105 | A * | 4/1993 | Bond | A01K 85/00 43/42.28 |
| 5,335,443 | A * | 8/1994 | Grigsby, Jr. | A01K 85/00 43/43.14 |
| 5,388,367 | A * | 2/1995 | Rydell | A01K 83/00 43/42.1 |
| 5,491,927 | A * | 2/1996 | Ortiz | A01K 85/00 43/42.28 |
| 5,551,185 | A * | 9/1996 | Reed | A01K 85/00 43/42.31 |
| 5,673,508 | A * | 10/1997 | Snyder | A01K 83/00 43/42.37 |
| 5,822,914 | A * | 10/1998 | Tadych | A01K 85/02 43/42.39 |
| 5,890,317 | A * | 4/1999 | Hollomon | A01K 83/06 43/44.8 |
| 6,122,855 | A * | 9/2000 | Heuke | A01K 85/00 43/42.09 |
| 6,772,553 | B2 * | 8/2004 | Phillips | A01K 85/02 43/42.11 |
| 6,898,894 | B1 * | 5/2005 | Anderson | A01K 85/00 43/42.39 |
| 7,614,178 | B2 * | 11/2009 | Hoyt | A01K 85/01 43/42.31 |
| 7,748,157 | B1 * | 7/2010 | Hellmann | A01K 85/00 43/42.39 |
| 8,458,950 | B2 * | 6/2013 | Mayer | A01K 85/00 43/42.32 |
| 9,010,015 | B2 * | 4/2015 | Lorentz | A01K 85/00 43/42.39 |
| 9,185,891 | B2 * | 11/2015 | Nakamichi | A01K 83/00 |
| 9,241,481 | B1 * | 1/2016 | Jackson, III | A01K 85/12 |
| 9,253,966 | B2 * | 2/2016 | Scholfield | A01K 85/01 |
| 9,433,196 | B1 * | 9/2016 | Micelli | A01K 85/18 |
| 9,456,592 | B1 * | 10/2016 | Payer | A01K 85/02 |
| 9,814,221 | B2 * | 11/2017 | Merritt | A01K 95/00 |
| 9,936,681 | B2 * | 4/2018 | Mancini | A01K 85/00 |
| 10,123,520 | B2 * | 11/2018 | Furuya | A01K 95/00 |
| 11,224,209 | B1 * | 1/2022 | Gunness | A01K 85/02 |
| 2003/0145507 | A1 * | 8/2003 | Claverie, III | A01K 85/00 43/4.5 |
| 2005/0132634 | A1 * | 6/2005 | Reed | A01K 85/00 43/44.81 |
| 2007/0044368 | A1 * | 3/2007 | Duckett | A01K 85/08 43/42.25 |
| 2007/0271838 | A1 * | 11/2007 | Lowiecki | A01K 85/02 43/42.39 |
| 2008/0148623 | A1 * | 6/2008 | Uhrig | A01K 85/02 43/42.39 |
| 2008/0313948 | A1 * | 12/2008 | Lewis | A01K 85/01 43/42.24 |
| 2009/0077859 | A1 * | 3/2009 | Aylsworth | B22D 19/00 43/42.39 |
| 2009/0113783 | A1 * | 5/2009 | Hollomon | A01K 85/00 43/42.31 |
| 2009/0211144 | A1 * | 8/2009 | Murphy | A01K 85/00 43/42.19 |
| 2010/0229454 | A1 * | 9/2010 | Cunningham | A01K 85/00 43/42.31 |
| 2010/0313463 | A1 * | 12/2010 | Coxey | A01K 85/00 43/42.39 |
| 2010/0325938 | A1 * | 12/2010 | Gillihan | A01K 83/06 43/44.4 |
| 2011/0296738 | A1 * | 12/2011 | Howe | A01K 85/00 43/42.37 |
| 2012/0005946 | A1 * | 1/2012 | Bennis | A01K 85/00 43/42.53 |
| 2012/0079757 | A1 * | 4/2012 | Rye | A01K 85/01 43/42.09 |
| 2012/0174468 | A1 * | 7/2012 | Nakamichi | A01K 83/00 43/44.81 |
| 2013/0180158 | A1 * | 7/2013 | Butters | A01K 85/02 43/42.1 |
| 2014/0237889 | A1 * | 8/2014 | Tamburro | A01K 85/00 43/42.09 |
| 2015/0208624 | A1 * | 7/2015 | Krohn | A01K 85/00 43/42.49 |
| 2016/0235049 | A1 * | 8/2016 | Thorne | A01K 85/14 |
| 2017/0231207 | A1 * | 8/2017 | Tarazona Sicilia | A01K 85/02 43/42.09 |
| 2018/0027786 | A1 * | 2/2018 | Baggett | A01K 85/00 |
| 2018/0168136 | A1 * | 6/2018 | Sano | A01K 91/06 |
| 2019/0104712 | A1 * | 4/2019 | Longas Vacas | A01K 85/01 |
| 2019/0133098 | A1 * | 5/2019 | Lee | A01K 91/04 |
| 2019/0269114 | A1 * | 9/2019 | Biggs | A01K 85/16 |
| 2021/0274761 | A1 * | 9/2021 | Kim | A01K 83/00 |

FOREIGN PATENT DOCUMENTS

| | | | | |
|---|---|---|---|---|
| FR | 2794939 | A1 * | 12/2000 | A01K 85/08 |
| FR | 2845565 | A1 * | 4/2004 | A01K 85/00 |
| FR | 2926188 | A1 * | 7/2009 | A01K 85/02 |
| GB | 1021663 | A * | 3/1966 | |
| JP | 03272633 | A * | 12/1991 | |
| JP | 2003079275 | A * | 3/2003 | |
| JP | 2006191821 | A * | 7/2006 | |
| JP | 2017000081 | A * | 1/2017 | |
| JP | 2019088264 | A * | 6/2019 | |
| KR | 20070006212 | A * | 1/2007 | |
| KR | 20070009933 | A * | 1/2007 | |
| KR | 100702172 | B1 * | 3/2007 | |
| KR | 100760354 | B1 * | 10/2007 | |
| KR | 100760356 | B1 * | 10/2007 | |
| KR | 100789163 | B1 * | 12/2007 | |
| KR | 101242178 | B1 * | 3/2013 | |
| KR | 101445486 | B1 * | 9/2014 | |
| WO | WO-2005022990 | A1 * | 3/2005 | A01K 85/02 |
| WO | WO-2017070118 | A1 * | 4/2017 | A01K 97/05 |
| WO | WO-2017142246 | A1 * | 8/2017 | A01K 85/02 |

* cited by examiner

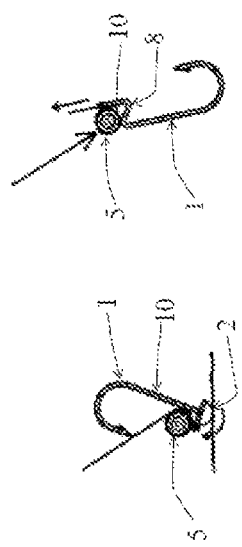
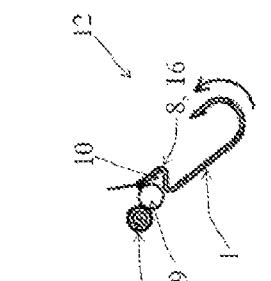
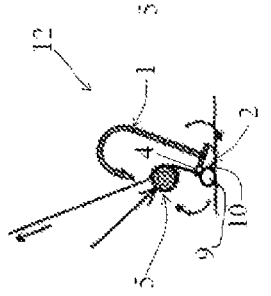
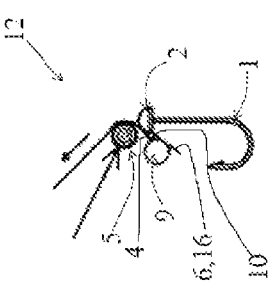
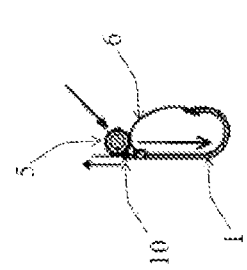
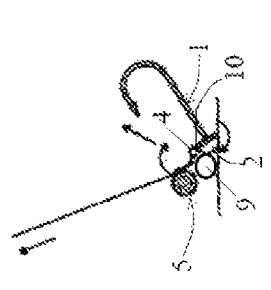
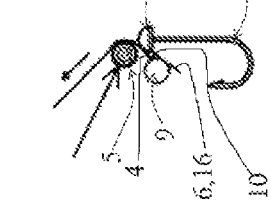
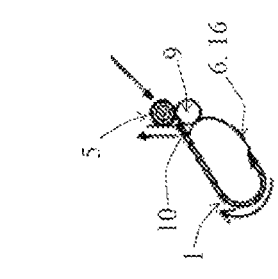
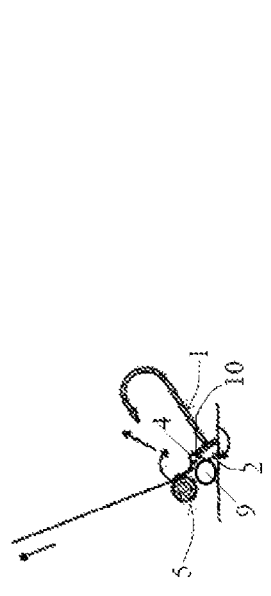
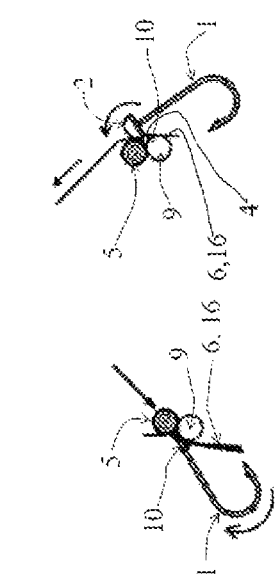

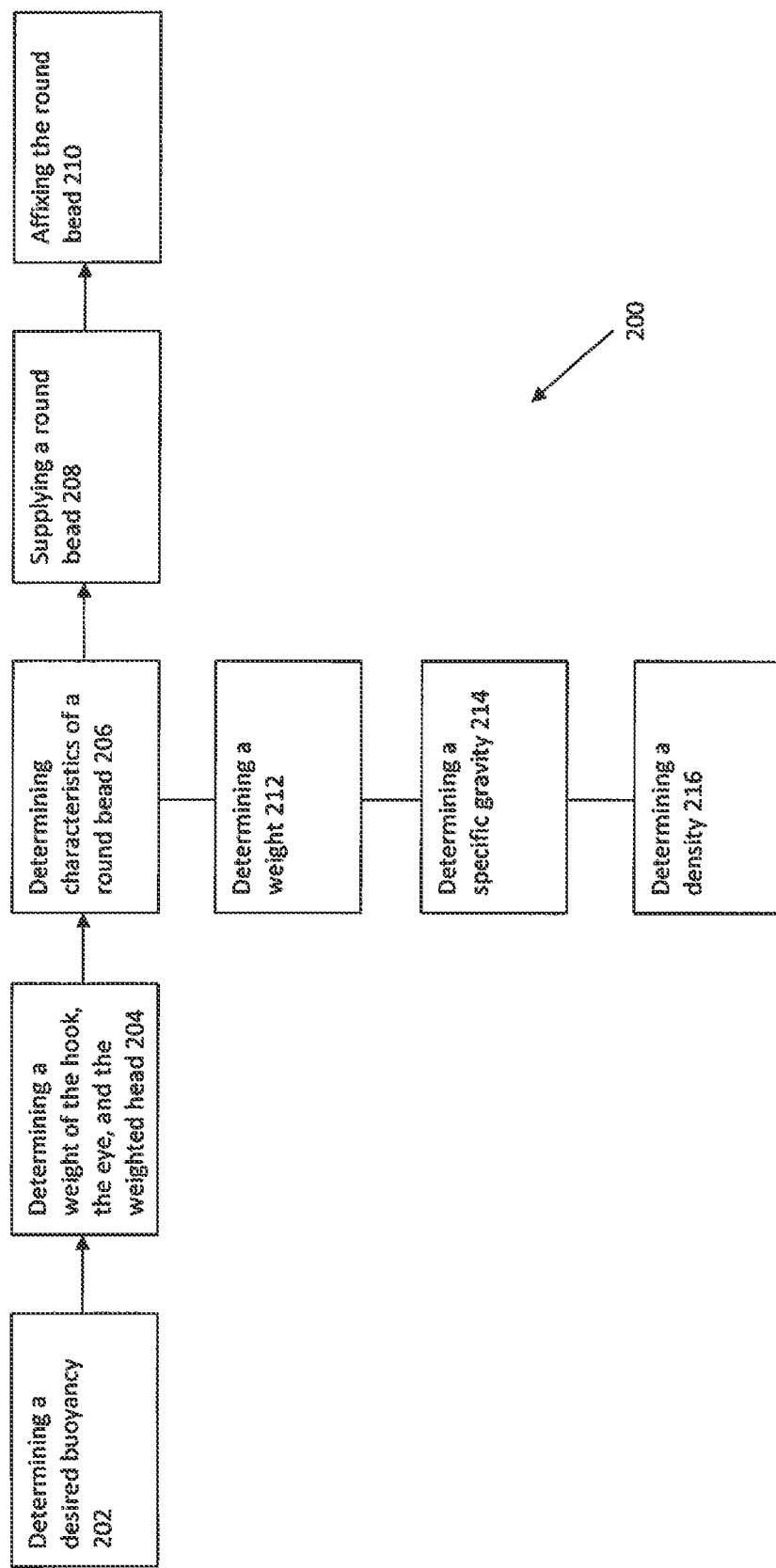

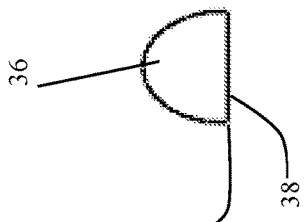
Fig. 11c
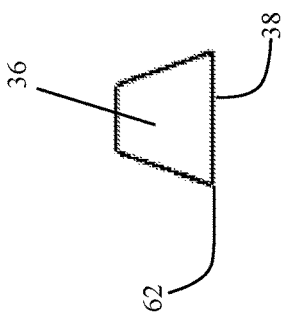
Fig. 11f
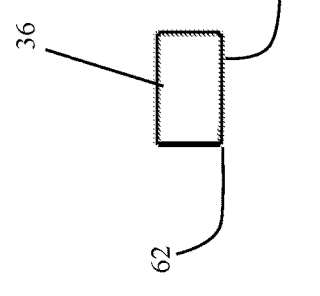
Fig. 11h
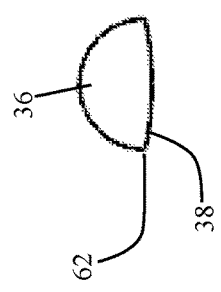
Fig. 11b
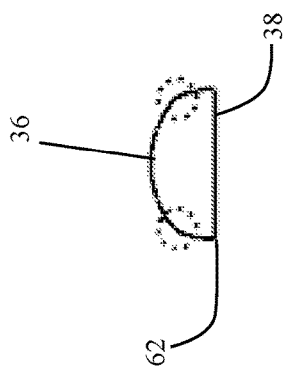
Fig. 11e
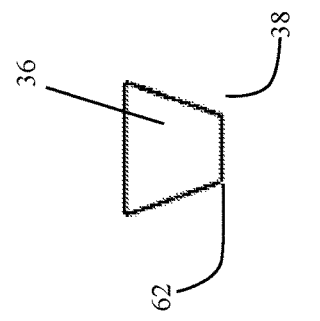
Fig. 11g
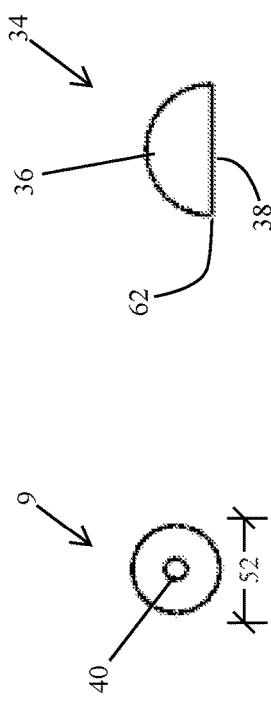
Fig. 11a
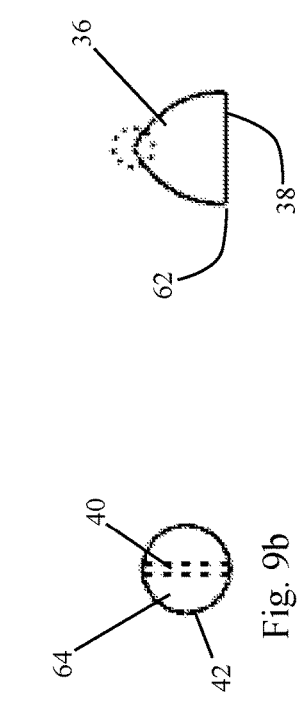
Fig. 11d
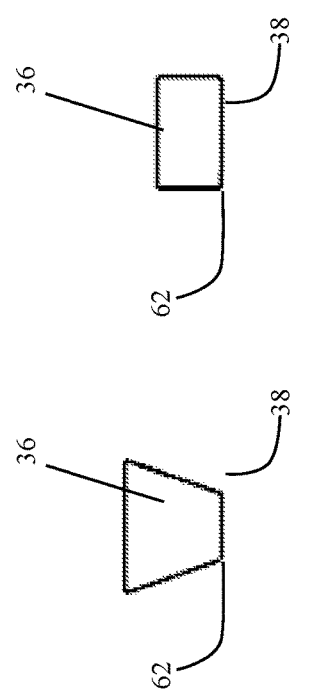
Fig. 9a
Fig. 9b
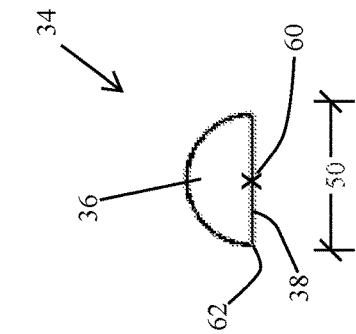
Fig. 10

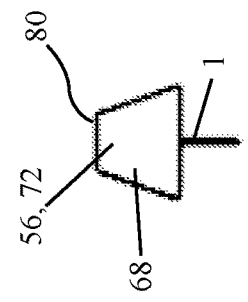
Fig. 13d
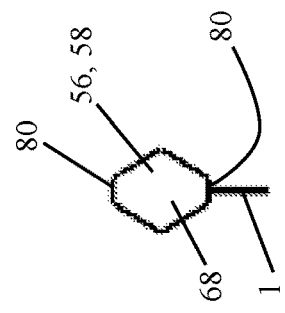
Fig. 12c
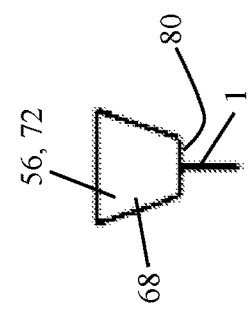
Fig. 13c
Fig. 12b
Fig. 13b
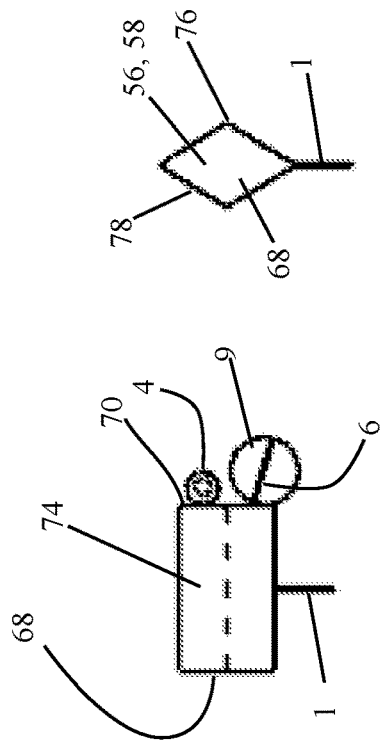
Fig. 12a
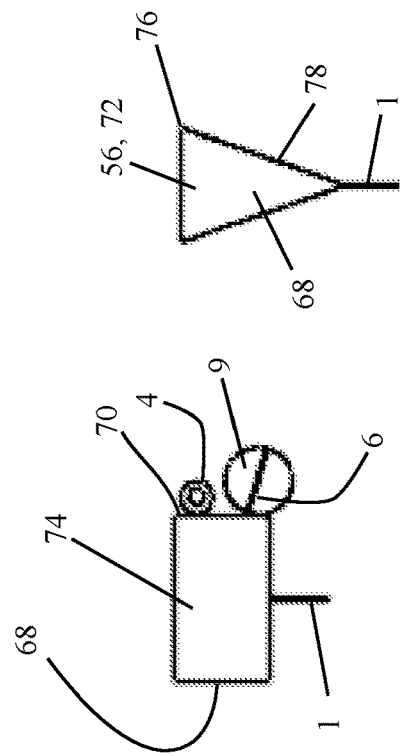
Fig. 13a

SNAG-FREE FISH HOOK ASSEMBLY, KIT, AND METHOD

CLAIM OF PRIORITY

This application is a continuation in part of and claims the benefit of priority of co-pending U.S. patent application Ser. No. 17/180,891, filed on Feb. 22, 2021.

FIELD OF THE INVENTION

The present invention relates generally to fishing gear, and specifically, to a fish hook assembly that will avoid snagging.

BACKGROUND

Fishing has been a practical and enjoyable hobby since time immemorial. Getting weeds and other detritus caught on one's hook has been an irritation also associated with fishing since time immemorial. A basic hook assembly includes a curved hook with a straight shank that ends in an eye through which a fishing line may be attached. Many hook assemblies include a weed guard extending generally from near the eye toward the barb of the hook. One common weed guard includes one or more fairly rigid spikes extending downward from near the eye toward the hook. This type of weed guard is referred to herein as a "flat weed guard." Another common weed guard includes a curved connector extending between the eye area and the end of the hook, where the connector may easily be depressed inward toward the shank of the hook if a fish were to bite. This type of weed guard is referred to herein as a "curved weed guard." Although weed guards do prevent some tangling, especially on the hook itself, a hook with a weed guard will not work well with fishing for certain types of fish or in certain conditions. Weed guards also do not prevent all tangles with the various detritus at or below the water's surface.

Referring to FIGS. 1a and 2a, side views of prior art hook assemblies with weed guards 6 are provided. Each has hook 1, ending in eye 4 through which fishing line 3 is attached. In FIG. 1a, weed guard 6 is a flat weed guard. In FIG. 2a, weed guard 6 is a curved weed guard. A notch 10 is formed between eye 4 and weed guard 6. Hook 1 has hook end 30 and eye end 32.

Now referring to FIG. 3a, a side view of a hook assembly with weighted head 2 is provided. A notch 10 is also formed in this embodiment between eye 4, weighted head 2, and line 3. In some embodiments, the eye 4 is incorporated into the weighted head 2, so that the notch 10 is between line 3 and the combined weighted head 2/eye 4. Weighted heads 2 are used to affect the descent rate of a hook assembly. The weight in the weighted head 2 is typically lead or tungsten. While having a heavier assembly may be desirable to provide a downward, head-down descent through the water column and on the bottom of the water body, there is also a desire for a slow descent and some movement of the bait to more realistically imitate what would naturally attract a fish and a weighted head detracts from these aspects. Weighted heads 2 therefore have advantages and disadvantages.

Now referring to FIG. 4a, a side view of a hook assembly with an offset bend 8 is provided. Bend 8 is simply an extra "s" or "z" shaped jog between the shank of hook 1 and eye 4. A notch 10 is also formed near eye 4 in this embodiment by the very nature of bend 8.

As discussed above, weed guards do prevent some weeds from getting caught in the curvature of the hook. Not all hook assemblies include weed guards, though, and weed guards do not prevent all obstructions. Notch 10, as shown in FIGS. 1a, 2a, 3a, and 4a, is particularly prone to catching snags. Notch 10 can easily catch on sand, gravel, stone, woods, weeds, leaves, sticks, etc. This can and does cause the entire hook assembly to become stuck or snagged, making it difficult or impossible to retrieve the hook assembly or causing the fishing line to break off or part from the eye. The loss of the hook assembly is frustrating; costly; bad for the environment from a littering point of view; and potentially toxic to the environment depending on the materials used in the hook assembly.

FIGS. 1b and 2b provide side views of the prior art hook assemblies shown in FIGS. 1a and 1b, respectively, with obstructions 5 lodged in notches 10. FIGS. 3b and 3c provide side views of the prior art hook assembly shown in FIG. 3a, with obstructions 5 getting caught in notch 10 in different ways. FIG. 4b provides a side view of the prior art hook assembly shown in FIG. 4a, with obstruction 5 lodged in notch 10. Although obstructions 5 are depicted as a round ball, it is understood that obstructions 5 may be anything on which the hook assembly may snag underwater, such as sand, gravel, stone, wood, weeds, leaves, sticks, etc., so obstructions 5 are not likely to be neat, round balls in reality. One of ordinary skill in the art will recognize that there are many ways in which many underwater items may get snagged in the notches 10 of the various prior art hook assemblies.

Therefore there is a need for a hook assembly that prevents such snagging in such notches.

SUMMARY OF THE INVENTION

The present invention is a hook assembly, a hook assembly kit, and a method for preparing to fish. Although the present invention is directed toward the art of fishing, it is recognized that it may have applicability in other areas.

In its most basic form, the fish hook assembly of the present invention includes a hook with a hook end and an eye end; an eye disposed proximate to the eye end of the hook; an intermediary object disposed at the eye end of the hook such that a notch is formed between the intermediary object and the eye; and a round bead disposed in the notch. The hook is preferably a standard curved hook with a barb at the hook end, that curves from the hook end in a generally "u" shape, and then extends straight through the shaft to the eye end of the hook. Any hook commonly used in the art of fishing may be used. The eye is at or right next to the eye end of the hook. The eye is a standard hole through which fishing line will be threaded so as to affix the fishing line to the hook. The intermediary object may be any commonly used in the art of fishing, such as, non-exclusively, a weed guard extending at least partially from the eye to the hook end of the hook, particularly either a flat or curved weed guard, as discussed above; a weighted head; a bend between the eye and the eye end of the hook, in which case the bend itself is the notch; and a fish attractor component. A fish attractor component may be, for example, a rubber worm. At least part of each of these possible intermediary objects is disposed right next to the eye so that a notch is formed between the intermediary object and the eye. As discussed above, this notch is a prime area for snags. The round bead that is affixed into the notch prevents such snags.

The round bead need not be perfectly round, but it preferably essentially round, that is to say, its surface may be round, oval, or teardrop-shaped, but may also be multi-faceted, like a convex dodecahedron, so that the shape is generally round but does have obtuse angles. In some embodiments, however, the round bead is spherical. The roundedness of the bead allows obstructions to simply roll off of, or be shed from, the surface of the bead in almost any direction, from any side and in any orientation of the hook. The round bead may also be hollow or solid and may be made of any solid material. Hollow beads may be filled with a very light gas to make them more buoyant. "Light gas" may be, for examples, air, oxygen, hydrogen, helium, etc., but generally should be less dense than air at 1 atm and 10° C. The bead may be affixed in the notch by any means commonly used in the art, such as adhesive, welding, tying, clipping, etc.

The eye of the hook assembly is at eye level. The bead is preferably disposed in the notch so that at least the top of the bead is at or above eye level. This will avoid snags in the eye itself. The bottom of the eye is the point on the eye that is closest to the eye end of the hook. For many hook assemblies, this will be the intersection of the eye and the eye end of the hook. The top of the eye is the point on the eye that is farthest away from the bottom of the eye. If there were a plane perpendicular to the shank of the hook (where the shank is straight), then eye level would be a parallel plane to that plane, where the eye level plane intersects the top of the eye. The bottom of the hook is the point on the hook farthest away from the eye. The bottom of the bead is the point on the bead closest to the bottom of the hook. The top of the bead is the point on the bead farthest away from the bottom of the bead. The top of the bead is preferably at or above eye level. In this context, "above" means in the direction of the fishing line if fishing line were threaded through the eye and the hook assembly were dangling from the fishing line in air.

An alternative embodiment of the fish hook assembly of the present invention includes a hook with a hook end and an eye end, as described above; a substantially hemispherical head with a rounded portion, a flatter portion, and an intersection edge formed therebetween, where the eye end of the hook extends from the center of the flatter portion; an eye, as described above, attached to and extending from the substantially hemispherical head; a weed guard attached to and extending from the substantially hemispherical head; and a round bead with a bead surface in physical contact with at least the weed guard and not in physical contact with the hook. As used herein, the term "substantially hemispherical head" does not necessarily mean that the head is perfectly hemispherical (although it may be), but also includes slight derivations from perfect hemisphericality, such as a slightly convex flatter portion, an elongated rounded portion, a slightly boxier rounded portion, etc. Some of these derivations are illustrated below. As mentioned, and importantly, the round bead is not in physical contact with any portion of the hook. As the hook is the working part of a fishing assembly, it is preferred that round bead not take up any length of the hook and remain physically separate so as not to disrupt or get in the way of the function of the hook in any way. As will be apparent herein, the flatter portion of the substantially hemispherical head is "flatter" with respect to the rounded portion of the substantially hemispherical head. The rounded portion is always more rounded than the flatter portion. The flatter portion may be perfectly flat or may be somewhat rounded, but it is never as rounded as the rounded portion.

The weed guard may be a flat weed guard or a curved weed guard, but a flat weed guard is preferred. It is preferred that the round bead include a channel extending through its interior and the weed guard is disposed through the channel. The weed guard is preferably trimmed so that it extends no further than the bead surface of the round bead. In other words, it is preferred that the weed guard be entirely encapsulated within the channel of the round bead and not stick out of the far side of the round bead (away from the substantially hemispherical head) at all. It is preferred that an adhesive, preferably a waterproof adhesive such as gel superglue, is disposed in the channel around the weed guard to hold the weed guard and round bead securely together. The weed guard may extend from any portion of the substantially hemispherical head, but preferably extends from either the rounded portion or the intersection edge. It is preferred that the weed guard not extend from the flatter portion of the substantially hemispherical head. This is because (similar to the reasoning for not having the round bead touch the hook at all), the weed guard may get in the way of the basic functionality of the hook if it extends from the flatter portion, rather than the rounded portion or the intersection edge.

When the weed guard does not extend through the round bead, the round bead is preferably disposed so that it contacts the eye at exactly one first point on the bead surface of the round bead and at exactly one second point on the bead surface of round bead. The round bead may be held in such a position by any means commonly used in the art, such as by a thin string, such as fishing line, or by a waterproof adhesive, or by being manufactured as a single integrated piece with the features disposed as described.

The round bead has a bead diameter. The flatter portion of the substantially hemispherical head has a head diameter. It is preferred that there be a relatively small disparity in size between the round bead and the substantially hemispherical head. As such, it is preferred that the ratio of the head diameter to the bead diameter be between 0.6:1 and 1:0.6. That is to say, one may be larger than the other (or they may have the same sized diameters), but the absolute disparity between their diameters is never greater than 0.6:1.

The fish hook assembly may include a ned worm. The ned worm is preferably a rubber or plastic attractor component commonly used in the art of fishing, such as a rubber worm or other shape of artificial rubber bait, such as crawfish, fairy, etc, that is manufactured for that purpose. At least a portion of the hook is disposed through at least a portion of the ned worm. Preferably only the hook end of the hook will be outside of the ned worm and the ned worm may extend farther down than the hook.

All of the variations of the fish hook assembly of the present invention that include a substantially hemispherical head may instead include a polyhedron head. Each of the substantially hemispherical head or polyhedron heads are examples of weighted heads, as discussed above. Unlike most variations of the substantially hemispherical head, the polyhedron head is angled, rather than rounded. The polyhedron has first and second faces connected by a polyhedron body having preferably either a substantially diamond shaped cross section or a substantially triangle shaped cross section. Either cross section may be regular or irregular.

As used herein, "substantially diamond shaped cross section" means that the cross section may be quadrilateral, where the four sides may be in any configuration, such as any form of a parallelogram (including squares, rhombuses, rectangles) or where the four sides are less regular and vary in side length and angles therebetween. "Substantially diamond shaped cross section" may also mean that the cross section has five sides, so that it is like any of the quadrilateral versions just described, but one vertex is truncated. "Substantially diamond shaped cross section" may also mean that the cross section has six sides, so that it is like any of the quadrilateral versions just described, but two vertices are truncated. In either embodiment with a substantially diamond shaped cross section where one or two vertices is truncated, the hook of the fishing assembly typically extends from the (or a) truncated vertex of the polyhedron body. The preferred polyhedron head has a substantially diamond shaped cross section that looks like a diamond with each of the acute angled vertices truncated, so that the cross section has six sides, and the hook extends from one of the truncated vertices of the polyhedron body.

As used herein, "substantially triangle shaped cross section" means that the cross section generally looks like a triangle. That is to say, it may have three sides or it may have four sides because one of the vertices of the triangle is truncated. The hook may extend from a vertex, from a truncated side, or from any other side of the polyhedron body.

In its most basic form, the fish hook assembly kit of the present invention is any of the fish hook assemblies of the present invention and fishing line of an appropriate thickness so that it can be threaded through the eye of the hook assembly. The kit may also include a fishing pole.

In its most basic form, the method for preparing to fish includes the following steps: determining a desired buoyancy of a fish hook assembly, where the fish hook assembly is any of the present invention, notably including a bead for affixation in the notch; determining a weight of the hook, the eye, and the weighted head of the fishing hook assembly; determining characteristics of a round bead that will effect the desired buoyancy when affixed to the notch; supplying a round bead with those characteristics; and affixing the supplied round bead to the notch of the fish hook assembly.

As discussed in the Background, how a hook assembly moves through the water is an important aspect of its utility and likelihood of successful fishing. In addition to weighted heads, a fisherman may use a heavier fishing line material for strength, but as with the weighted heads, this will affect the drop rate and action of that hook assembly. The action may also be affected by the buoyancy of any rubber bait attached to the hook assembly, which will tend to slow the descent of the assembly through the water column, and importantly through the strike zone where fish may be floating in a stationary fashion. It is generally thought that lighter assemblies will more realistically imitate the action of a natural target for a fish. Then again, there are also advantages, discussed above, to a heavier assembly. An option would be to use a large rubber bait whose buoyancy could offset the weight of the other components of the assembly, but larger rubber baits are not desirable because they are so prone to getting caught on underwater objects other than fish.

The answer lies in selecting the correct bead to include in the hook assembly of the present invention. As discussed above, the placement of the bead in the notch of the hook assembly will prevent many unwanted snags at the eye of the hook assembly. The characteristics of the bead itself can also address the issues of weight, buoyancy, and action of the hook assembly as a whole, however. The specific gravity of the material from which the bead is made can alter the descent rate and action characteristics of the assembly and its bait. A bead that has the right floatation characteristics could slow the rate of descent of an assembly with a weighted head and provide greater floating action at the bottom, while simultaneously providing protection to the eye from snags. The bead might also be nearly the same density as water and not affect the floating action of the hook assembly if that is desired.

There is yet another advantage to having the floatation of the bead offset the weight of the weighted head. When a hook assembly is thrown into cover (meaning the weeds and other matter on top of or near the surface of the water), the weight of the head and its momentum when being cast is what allows the hook to penetrate the cover and sink into the water column below the cover and to the bottom. Because it is desirable to have as much action as possible with the assembly, it makes sense to allow the bead to counteract the weight of the larger weights of the head once the assembly is through the cover and into the water column. Physics dictates that the weight of the head will determine the ability of the assembly to penetrate a cover because the momentum in the weight determines the preservation of the force needed to penetrate something. The momentum that generates the force with a hook assembly is concentrated in the head weight and the hook, and to some small extent in the worm. The weight of the bead also figures into the momentum equation, with the variable being the height and angle from which the assembly meets the water surface, and specifically the cover it is designed to penetrate. Once it penetrates the cover, however, which is usually the instant it contacts the cover and proceeds into the water column, the characteristics of the assembly change: the metal portions weigh less by the volume of water they displace, but the worm is already designed to be lighter than water, and the bead can now perform its intended function of clearing snags that might impede retrieval of the assembly and imparting more buoyancy to the assembly once it is through the cover and into the water column.

Applying these considerations to the method of the present invention, all of these factors contribute to the desired buoyancy of the fish hook assembly. As discussed above, it is desirable for the hook assembly to have sufficient weight, likely in the weighted head, for the hook assembly to move well through the water column. The specific gravity of the bead may allow for that weight while also counteracting the dropping motion with flotation characteristics that will slow the descent and provide realistic action. Even a small bead may counteract a large weight by its manufacturing characteristics, such as the material out of which it is made; whether it is hollow or solid; and if hollow, what gas fills the center. The desired buoyancy of the hook assembly will also depend on the water that is being fished. Salt water and fresh water have different densities, for example, which will require different hook assembly buoyancies for optimal performance. As such, when used herein the term "desired buoyancy" encompasses not just the hook assembly's overall density or mass per volume, but also the mass of its individual components, especially the weighted head and the bead, and how those weights may counteract one another; and possibly the density of the water being fished.

The first step in the method of the present invention is to determine this desired buoyancy. The second step is to determine the weight of the hook, the eye, and the weighted head, where it is understood that the weighted head is the main contributor to the sum of the weights of these components. Notably, a fisherman may be able to use a heavier weighted head than he would normally select, gaining the advantages of a heavier weight, knowing that the disadvantages will be offset by the bead's characteristics. The third step is to determine those bead characteristics that will effect the desired buoyancy. These bead characteristics may be the beads weight, specific gravity, and/or density, non-exclusively. Finally, a bead with those characteristics is sourced and affixed in place on the hook assembly.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIGS. 1a and 1b are side views of a prior art fish hook assembly with a flat weed guard.

FIGS. 1c and 1d are side views of a fish hook assembly of the present invention similar to the prior art fish hook assembly provided in FIGS. 1a and 1b.

FIGS. 2a and 2b are side views of a prior art fish hook assembly with a curved weed guard.

FIGS. 2c and 2d are side views of a fish hook assembly of the present invention similar to the prior art fish hook assembly provided in FIGS. 2a and 2b.

FIGS. 3a-3c are side views of a prior art fish hook assembly with a weighted head.

FIGS. 3d-3g are side views of a fish hook assembly of the present invention similar to the prior art fish hook assembly provided in FIGS. 3a-3c.

FIGS. 4a and 4b are side views of a prior art fish hook assembly with an offset bend.

FIG. 4c is a side view of a fish hook assembly of the present invention similar to the prior art fish hook assembly provided in FIGS. 4a and 4b.

FIG. 6 is a flow chart illustrating the steps of the method of the present invention.

FIGS. 9a and 9b are top down and side views of a round bead of the fish hook assembly of the present invention.

FIG. 10 is a detail of the substantially hemispherical head of the fish hook assembly of the present invention.

FIGS. 11a-11h illustrate various shapes of the substantially hemispherical head of the fish hook assembly of the present invention.

FIGS. 12a-12c are various views of a fish hook assembly with a polyhedron head with a substantially diamond shaped cross section.

FIGS. 13a-13d are various views of a fish hook assembly with a polyhedron head with a substantially triangle shaped cross section.

DETAILED DESCRIPTION

Figure 1A:
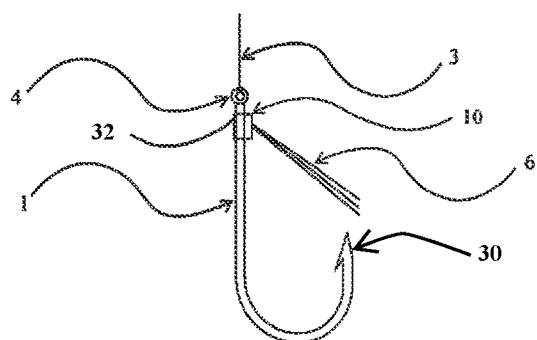
Figure 2A:
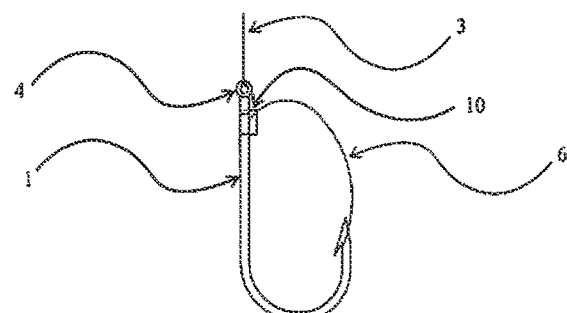

Now referring to FIGS. 1c and 2c, side views of hook assembly 12 of the present invention are provided. Like the prior art assemblies shown in FIGS. 1a and 2a, the hook assemblies 12 shown in FIGS. 1c and 2c have intermediary objects 16 that are weed guards 6. Unlike the prior art assemblies, however, the hook assemblies 12 of the present invention also include bead 9 disposed in notch 10. Instead of becoming lodged in notch 10, as shown in FIGS. 1b and 2b, obstructions 5 are prevented from entering notch 10 by the presence of bead 9. As shown in FIGS. 1d and 2d, the obstructions 5 are simply shed off of or roll off of bead 9.

Figure 3A:
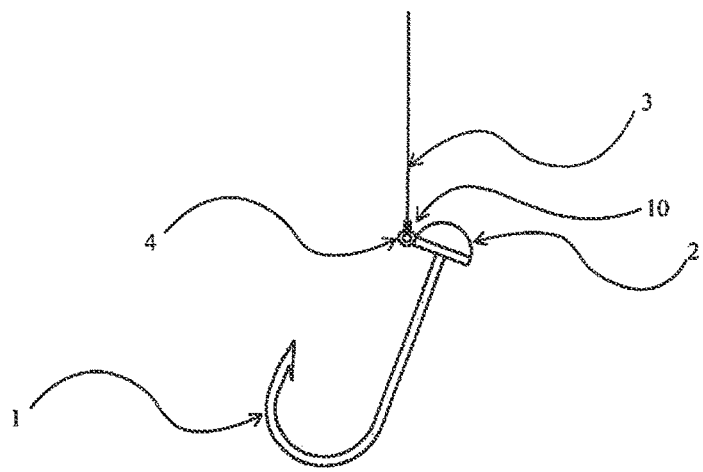

FIGS. 3d-3g disclose hook assemblies 12 with an intermediary object 16 that is weighted head 2 or weed guard 6 In FIGS. 3d and 3e, eye end 32 (as shown, e.g., in FIG. 1a) includes a weighted head 2, but weed guard 6 is intermediary object 16. These embodiments are similar to the prior art assembly shown in FIGS. 3a-3c, except that the hook assemblies 12 of the present invention include beads 9. As shown in FIGS. 3d and 3f, obstruction 5 cannot get into notch 10 because bead 9 is disposed therein. As shown in FIGS. 3e and 3g, obstruction 5 simply rolls away from or off of bead 9.

Figure 4A:
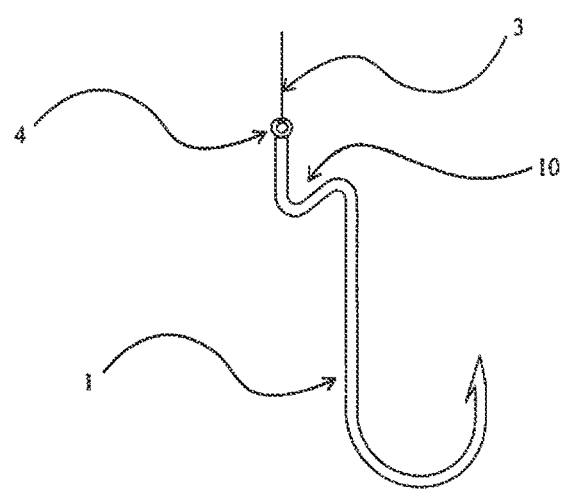

FIG. 4c discloses hook assembly 12 of the present invention including bend 8 as the intermediary object 16. Hook assembly 12 is similar to the prior art assemblies shown in FIGS. 4a and 4b, except that hook assembly 12 of the present invention includes bead 9. Obstruction 5 cannot get snagged in notch 10 and simply rolls off of bead 9. Bead 9 is at or above eye level 14, as explained in more detail below with reference to FIG. 5.

Figure 5:
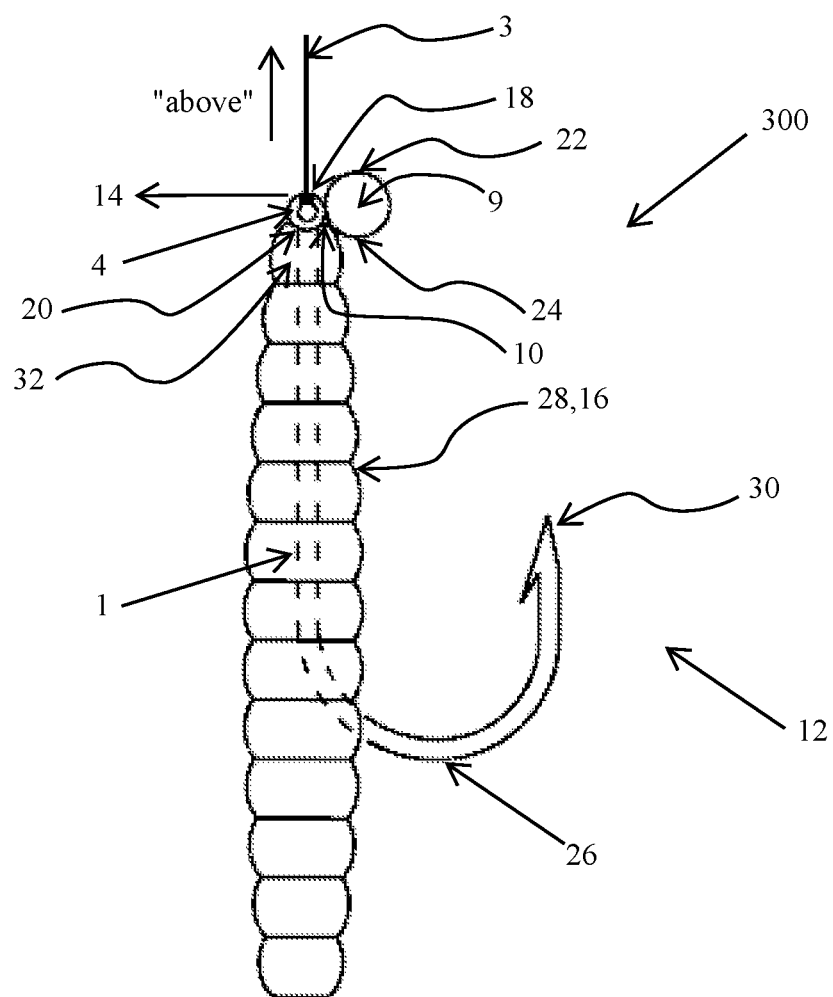
FIG. 5 is a side view of a fish hook assembly of the present invention.

Now referring to FIG. 5, a side view of hook assembly 12 where the intermediate object 16 is fish attractor component 28 is provided. Although fish attractor component 28 is shown as a rubber worm, it is understood that this component 28 may take many forms, such as a shiny or shining object or a small fake fish, and each of these forms is contemplated as being within the scope of the present invention. Eye 4 of hook assembly 12 is at eye level 14. Bead 9 is preferably disposed in notch 10 so that at least top 22 of bead 9 is at or above eye level 14. Bottom 20 of eye 4 is the point on eye 4 that is closest to eye end 32 of hook 1. For many hook assemblies 12, such as the one shown, this will be the intersection of eye 4 and eye end 32 of hook 1. Top 18 of eye 4 is the point on eye 4 that is farthest away from bottom 20 of eye 4. If there were a plane perpendicular to the shank of hook 1 (where the shank is straight, as shown), then eye level 14 would be a parallel plane to that plane, where eye level 14 intersects top 18 of eye 4. Bottom 26 of hook 1 is the point on hook 1 farthest away from eye 4. Bottom 24 of bead 4 is the point on bead 4 closest to bottom 26 of hook 1. Top 22 of bead 9 is the point on bead 9 farthest away from bottom 24 of bead 9. Top 22 of bead 9 is preferably at or above eye level 14. In this context, "above" means in the direction of fishing line 3 if fishing line 3 were threaded through eye 4 and hook assembly 12 were dangling from fishing line 3 in air. FIG. 5 also shows kit 300 of the present invention in its most basic form. Kit 300 includes hook assembly 12 and fishing line 3 that is of a size that can fit through eye 4. A fishing pole (not shown) may also be included in kit 300.

Now referring to FIG. 6, a flow chart illustrating the steps of method 200 of the present invention is provided. Method 200 for preparing to fish includes the following steps: determining a desired buoyancy 202 of a fish hook assembly, where the fish hook assembly is any of the present invention, notably including a bead for affixation in the notch; determining a weight 204 of the hook, the eye, and the weighted head of the fishing hook assembly; determining characteristics of a round bead 206 that will effect the desired buoyancy when affixed to the notch; supplying a round bead 208 with the characteristics determined in step 206; and affixing the round bead 210 supplied in step 208 to the notch of the fishing hook assembly. The step of determining characteristics of the round bead 206 may include any or all of determining the weight 212, specific gravity 214, and/or density 216 of the bead.

Figure 7A:
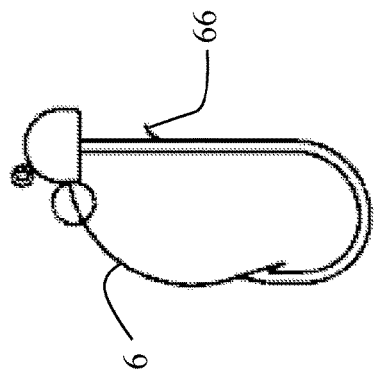
FIGS. 7a-7d are side views of other embodiments of the fish hook assembly of the present invention where the weed guard is disposed through the channel of the round bead.
Figure 7B:
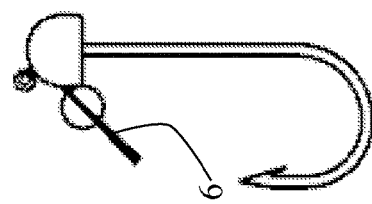
Figure 7C:
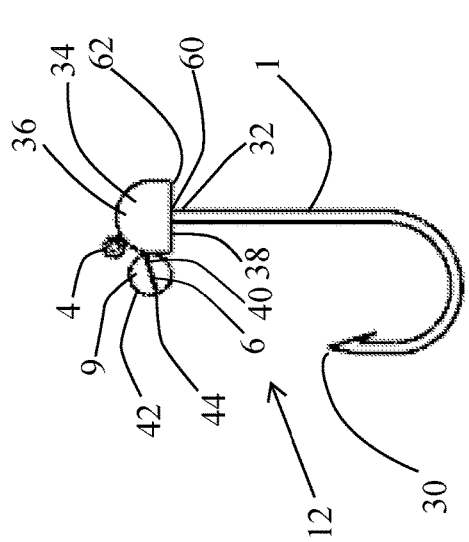
Figure 7D:
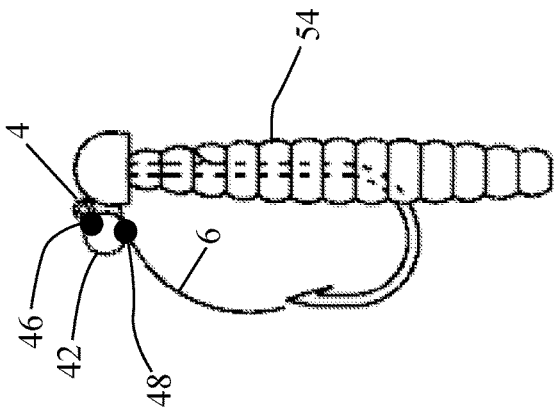

Now referring to FIGS. 7a-7d, side views of an alternate embodiment of fish hook assembly 12 of the present invention. All features are indicated in FIG. 7a and similar features in FIGS. 7b-7d are understood to be the same as indicated in FIG. 7a. Hook 1 has hook end 30 and eye end 32. Eye end 32 intersects with substantially hemispherical head 34. The meaning of term "substantially hemispherical head" is described in more detail in FIGS. 11a-11e and their surrounding text below. Substantially hemispherical head 34 has a rounded portion 36 and a flatter portion 38. Eye end 32 extends from center 60 of flatter portion 38. Weed guard 6 extends from substantially hemispherical head 34, preferably from rounded portion 36, as shown, or from an intersection edge 62 between rounded portion 36 and flatter portion 38. Eye 4 also extends from substantially hemispherical head 34, preferably from rounded portion 36, as shown. It is understood, however, that weed guard 6 and/or eye 4 may also extend from flatter portion 38, although this is not preferred. Round bead 9 is in physical contact with at least the weed guard 6 and this is the most important physical contact. Round bead 9 includes channel 40 that bores through the interior 64 (as shown in FIG. 9b) of round bead 9. Weed guard 6 extends through channel 40 and is held in place with adhesive 44 that fills channel 40 around weed guard 6. Adhesive 44 is preferably waterproof, such as gel superglue. For illustrative purposes, weed guard 6 is visible in FIGS. 7a-7d extending through channel 40 of round bead 9, but it is understood that unless round bead 9 is translucent, channel 40 and the portion of weed guard 6 extending through channel 40 would not be visible. Round bead 9 may also physically touch substantially hemispherical head 34 and/or eye 4 at single points on bead surface 42 of round bead 9, but again, the most significant physical contact is with weed guard 6.

In FIGS. 7a-7c, weed guard 6 is a flat weed guard. In FIGS. 7a and 7b, weed guard 6 has been cut or trimmed so that it does not extend outside of round bead 9, i.e., that it extends no further than bead surface 42 of round bead 9. It is understood that in embodiments such as those shown in FIGS. 7a and 7b, where weed guard 6 does not extend outside of bead 9, that weed guard 6 may be any post-like structure extending out of substantially hemispherical head 34 that may support bead 9 as described. In FIG. 7c, weed guard 6 has not been cut or trimmed, so it extends all the way through channel 40 and beyond bead surface 42 on the other side. In FIG. 7d, weed guard 6 is a curved weed guard. FIG. 7b also includes ned worm 54 and a trimmed flat weed guard 6. Although not shown, it is understood that ned worm 54 may also be included in embodiments with non-trimmed flat or curved weed guards 6, as shown in FIGS. 7c and 7d.

In FIG. 7b, ned worm 54 is included. At least a portion of hook 1 extends through at least a portion of ned worm 54 so that hook end 30 extends outside of ned worm 54. The trajectory of hook 1 through the interior of ned worm 54 is shown in dashed lines, but it is understood that as hook 1 is within ned worm 54, this portion of hook 1 would not be visible unless ned worm 54 were translucent. Ned worm 54 is preferably a rubber attractant commonly used in the art of fishing. As discussed above, the shape and appearance of ned worm 54 should not be limited to the example illustrated in FIG. 7b. One of at least ordinary skill in the art will recognize that ned worms 54 commonly come in many shapes, sizes, colors, and variations. A ned worm 54 may look more like the fish attractor component 28 shown in FIG. 5, for example. Novelty ned worms 54 may not be shaped like a worm at all, but rather as a fish, a small crayfish, or a skirted nymph, for examples. Ned worms 54 may also include contouring along their length and/or an additional feature at their ends, like an appendage resembling a fin, for examples. Each of these variations will be easily recognized by one of ordinary skill in the art, and each is considered to be within the scope of the present invention. FIG. 7d includes barb 66, which is a common, optional feature of hook 1. If included, barb 66 is considered to be part of hook 1.

Figure 8A:
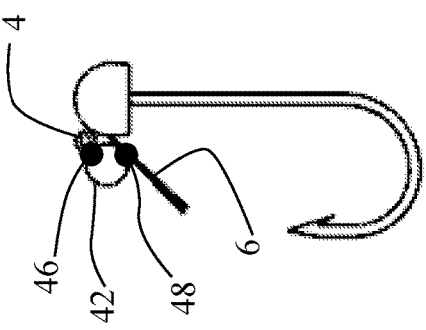
FIGS. 8a and 8b are detailed views of the embodiments of the fish hook assembly of the present invention similar to those shown in FIGS. 3d and 3e.
Figure 8B:
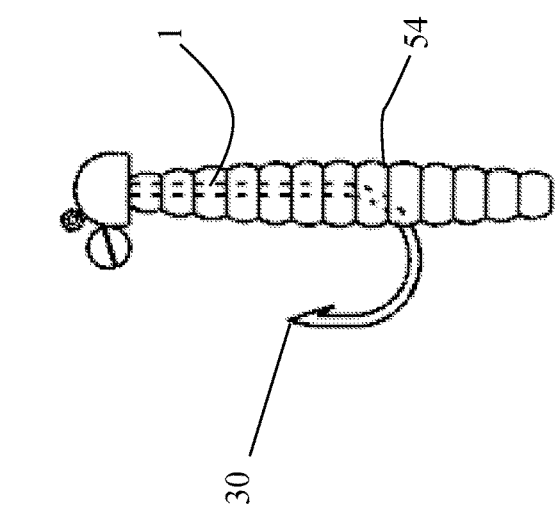

Now referring to FIGS. 8a and 8b, details of embodiments of fish hook assembly 12 similar to those illustrated in FIGS. 3d and 3e are provided. FIG. 8a includes a flat weed guard 6, similar to that shown in FIG. 7c. FIG. 8b includes a curved weed guard 6, similar to that shown in FIG. 7d, and a ned worm 54, similar to that shown in FIG. 7b. Again, it is understood that weed guard 6 may be trimmed (similar to that shown in FIGS. 7a and 7b) and that ned worm 54 may be included with an embodiment that includes any version of weed guard 6. As shown in FIGS. 8a and 8b, round bead 9 does not (necessarily) include channel 40. Unlike the embodiments shown in FIGS. 7a-7d, weed guard 6 does not extend through round bead 9, so a channel 40 is unnecessary. Instead, round bead 9 is affixed in place so that it is in physical contact with eye 4 at exactly one first point 46 on bead surface 42 and with weed guard 6 at exactly one second point 48 on weed guard 6 and has no other physical contact with any other component of fish hook assembly 12. First and second points 46, 48 are shown as black dots in order to identify their placement only. It is understood that these black dots are for illustrative reasons only and that the points of contact do not actually include such indicia. Round bead 9 is held in this position by any manner commonly used in the art, but preferably with thin string, such as fishing line, or with a waterproof adhesive.

Now referring to FIGS. 9a, 9b, and 10, features of round bead 9 and substantially hemispherical head 34 are provided. In FIG. 9a, a top down view of round bead 9 is provided with one hole indicating channel 40. In FIG. 9b, a side view of round bead 9 is provided with dashed lines indicating channel 40 extending through interior 64 of round bead 9 from one side of bead surface 42 to another. Again, it is understood that these dashed lines are merely illustrative and that channel 40 would only actually be visible if round bead 9 were translucent. Round bead 9 has bead diameter 52. Substantially hemispherical head 34 has rounded portion 36, flatter portion 38, and intersection edge 62 therebetween. In other words, intersection edge 62, is the edge created between rounded portion 36 and flatter portion 38. Intersection edge 62 may be a sharp edge or slightly rounded. Some variations on intersection edge 62 are illustrated below in FIGS. 11a-11h. As shown in FIGS. 7a-8b, for examples, hook 1 extends from center 60 (indicated with a small "x" in FIG. 10) of flatter portion 38. Flatter portion 38 has head diameter 50. A ratio of head diameter 50 to bead diameter 52 is preferably between 0.6:1 and 1:0.6. As an example, head diameter 50 may range between 0.6 and 1.0 cm and bead diameter 52 may range between 0.6 and 1.0 cm, so that regardless of the respective diameters 50, 52, their ratio is always between 0.6:1 and 1:0.6.

Now referring to FIGS. 11a-11h, examples illustrating the meaning of the term "substantially hemispherical" as used herein with respect to the head of the present invention are provided. As discussed above, the term "substantially hemispherical" does not necessarily mean perfectly hemispherical when used to describe the head of the fish hook assembly of the present invention. As shown in FIG. 11a, substantially hemispherical head 34 may be perfectly hemispherical so that rounded portion 36 is exactly half of a sphere and flatter portion 38 is perfectly flat. Slight derivations from this perfect hemisphere are also included within the term "substantially hemispherical head," however. In FIG. 11b, for example, flatter portion 38 is not perfectly flat, but is rather slightly convex. In FIG. 11c, for another example, rounded portion 36 is more than half of a sphere. It is shaped like a hemisphere that is then slightly elongated at its base into a cylindrical shape. In FIG. 11d, for another example, rounded portion 36 comes to something of a point (circled in dashed lines), so that substantially hemispherical head 34 resembles a conehead. In FIG. 11e, for another example, rounded portion 36 is slightly boxier than a hemisphere. The dotted circles indicate areas of rounded portion 36 that describe a rounded edge more severe than what one would see in a regular hemisphere, almost like "shoulders." In FIG. 11f, for another example, the "shoulders" of FIG. 11e have resolved into angles so that the substantially hemispherical head 34 has a trapezoidal cross section. Both the flatter portion 38 and the opposing face are round and the trapezoidal cross section may be a regular or an irregular trapezoid. In FIG. 11g, for another example, the trapezoidal substantially hemispherical head 34 is upended so that the smaller face is the flatter portion 38 from which hook 1 will extend. Finally, in FIG. 11h, for another example, substantially hemispherical head 34 is a cylinder. In such embodiments, which flat face is considered to be the flatter portion 38 will be the flat face from which hook 1 extends. The opposite flat face would be considered part of rounded portion 36. Each of the variations shown and combinations thereof (e.g., a combination of the variations shown in FIGS. 11b and 11d would have a slightly convex flatter portion 38 and a boxier rounded portion 36) are considered to be substantially hemispherical heads 34, as the term is used herein. One of at least ordinary skill in the art will recognize these variations and similar variations as being common variations of a weighted head and will recognize each of such variations as being described by the term "substantially hemispherical head."

Now referring to FIGS. 12a-13d, various views of fish hook assembly 12 with polyhedron head 56 are provided. Polyhedron head 56 is similar to substantially hemispherical head 34 or any weighted head 2 disclosed herein in that it is preferably made of lead, tungsten, or another dense metal. The inventor has found that the thinner head profiles presented with polyhedron heads 56 may be advantageous for slipping in and out of rocks, cracks, and other narrow structures that may be present under water. In this regard, the polyhedron heads 56 may be superior to their rounded or wider counterparts. FIG. 12a is a side view of part of fish hook assembly 12 with polyhedron head 56 with substantially diamond shaped cross section 58. Although all of hook 1 is not shown, it is understood to extend from the partial hook 1 structure indicated. Polyhedron head 56 has first face 68, second face 70, and polyhedron body 74 extending therebetween. The dashed line shown in FIG. 12a will be understood to be extending out of the page toward the viewer when considered in conjunction with FIGS. 12b and 12c. Eye 4 and weed guard 6 extending through bead 9 are attached to second face 70. Although the variation shown in FIG. 12a is most similar to that shown in FIG. 7a (except for the substitution of polyhedron head 56 for substantially hemispherical head 34), it is understood that any of the variations illustrated in FIGS. 7b-8b and their surrounding text may also be used with a polyhedron head 56, like that polyhedron heads 56 disclosed in FIGS. 12a-13d. Although first and second faces 68, 70 are illustrated as being flat, it is understood that they may not be perfectly flat. They may, for example, be slightly convex or concave or otherwise vary from perfect flatness. FIGS. 12b and 12c are views of first face 68, which also indicate the substantially diamond shaped cross section 58. In FIG. 12b, substantially diamond shaped cross section 58 has a classic diamond shape that is a quadrilateral with alternating acute and obtuse angles at the four vertices. In FIG. 12c, substantially diamond shaped cross section 58 is like that shown in FIG. 12b, but both acute angles have truncation 80, so that substantially diamond shaped cross section 58 actually has six sides. It is understood that there are also variations where only one vertex is truncated, so that substantially diamond shaped cross section 58 has five sides. As such, substantially diamond shaped cross section 58 always has at least four sides 78 and at least four vertices 76. Although the perspective of FIGS. 12b and 12c may suggest that hook 1 extends from first face 68, it is understood from FIG. 12a that hook 1 is preferably behind the page from the viewer and extends from polyhedron body 74. In some embodiments, however, hook 1 may extend from first or second face 68, 70.

FIG. 13a is a side view of part of fish hook assembly 12 with polyhedron head 56 with substantially triangle shaped cross section 72. Although all of hook 1 is not shown, it is understood to extend from the partial hook 1 structure indicated. Polyhedron head 56 has first face 68, second face 70, and polyhedron body 74 extending therebetween. Eye 4 and weed guard 6 extending through bead 9 are attached to second face 70. Although first and second faces 68, 70 are illustrated as being flat, it is understood that they may not be perfectly flat. They may, for example, be slightly convex or concave or otherwise vary from perfect flatness. FIGS. 13b-13d are views of first face 68, which also indicate the substantially triangle shaped cross section 72. In FIG. 13b, substantially triangle shaped cross section 72 is a classic triangle shape with hook 1 extending from a vertex 76 of the polyhedron body 74. In FIG. 13c, substantially triangle shaped cross section 72 is like that shown in FIG. 13b, but one vertex has truncation 80, so that substantially triangle shaped cross section 72 actually has four sides and hook 1 extends from the truncated side of polyhedron body 74. FIG. 13d is similar to FIG. 13c, but hook 1 extends from a non-truncated side of polyhedron body 74. As such, substantially triangle shaped cross section 72 always has at least three sides 78 and at least three vertices 76. Although substantially triangle shaped cross section 72 is generally shown in FIGS. 13b-13d as being an isosceles triangle, this is not required. The general triangle shape may, for examples, be equilateral or have all three sides with different lengths. Although the perspective of FIGS. 13b-13d may suggest that hook 1 extends from first face 68, it is understood from FIG. 13a that hook 1 is preferably behind the page from the viewer and extends from polyhedron body 74. In some embodiments, however, hook 1 may extend from first or second face 68, 70.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. A fish hook assembly comprising:
   a hook with a hook end and an eye end;
   a substantially hemispherical head comprising a rounded portion, a flatter portion, and an intersection edge formed therebetween, wherein said eye end of said hook extends from a center of said flatter portion of said substantially hemispherical head;
   an eye attached to and extending from said substantially hemispherical head;

a weed guard attached to and extending directly from said substantially hemispherical head; and a round bead in physical contact with at least said weed guard and not in physical contact with said hook, wherein said round bead comprises a bead surface, wherein:

said round bead comprises a channel disposed through an interior of said round bead;

said weed guard extends through said channel of said round bead; and said weed guard extends through said channel of said round bead no further than said bead surface of said round bead.

2. The fish hook assembly as claimed in claim 1, wherein said round bead is a spherical bead.

3. The fish hook assembly as claimed in claim 1, wherein said round bead further comprises an adhesive disposed within said channel of said round bead and around said weed guard.

4. The fish hook assembly as claimed in claim 1, wherein said weed guard is a flat weed guard.

5. The fish hook assembly as claimed in claim 1, wherein:
said flatter portion of said substantially hemispherical head comprises a head diameter;
said round bead comprises a bead diameter; and
a ratio of said head diameter to said bead diameter is between 0.6:1 and 1:0.6.

6. The fish hook assembly as claimed in claim 1, wherein said weed guard extends from said rounded portion of said substantially hemispherical head.

7. The fish hook assembly as claimed in claim 1, further comprising a ned worm, wherein at least a portion of said hook extends through at least a portion of said ned worm such that said hook end of said hook extends outside of said ned worm.

8. The fish hook assembly as claimed in claim 1, further comprising fishing line sized to fit through said eye.

9. The fish hook assembly as claimed in claim 8, further comprising a fishing pole.

10. A fish hook assembly consisting of:
a hook with a hook end and an eye end;
a substantially hemispherical head comprising a rounded portion, a flatter portion, and an intersection edge formed therebetween, wherein said eye end of said hook extends from a center of said flatter portion of said substantially hemispherical head;
an eye attached to and extending from said substantially hemispherical head;
a round bead comprising a channel disposed through an interior of said round bead and a bead surface, wherein said round bead is not in physical contact with said hook; and
a weed guard attached to and extending from said substantially hemispherical head and through said channel of said round bead;
wherein said round bead comprises an adhesive disposed within said channel of said round bead and around said weed guard.

11. The fish hook assembly as claimed in claim 10, wherein said weed guard extends through said channel of said round bead no further than said bead surface of said round bead.

12. The fish hook assembly as claimed in claim 10, wherein said round bead is a spherical bead.

13. The fish hook assembly as claimed in claim 10, wherein said weed guard is a flat weed guard.

14. The fish hook assembly as claimed in claim 10, wherein:
said flatter portion of said substantially hemispherical head comprises a head diameter;
said round bead comprises a bead diameter; and
a ratio of said head diameter to said bead diameter is between 0.6:1 and 1:0.6.

15. The fish hook assembly as claimed in claim 10, wherein said weed guard extends from said rounded portion of said substantially hemispherical head.

16. The fish hook assembly as claimed in claim 10, further comprising fishing line sized to fit through said eye.

17. The fish hook assembly as claimed in claim 16, further comprising a fishing pole.

18. A fish hook assembly consisting of:
a hook with a hook end and an eye end;
a substantially hemispherical head comprising a rounded portion, a flatter portion, and an intersection edge formed therebetween, wherein said eye end of said hook extends from a center of said flatter portion of said substantially hemispherical head;
an eye attached to and extending from said substantially hemispherical head;
a weed guard attached to and extending directly from said substantially hemispherical head;
a round bead in physical contact with at least said weed guard and not in physical contact with said hook, wherein said round bead comprises a bead surface, wherein:
said round bead comprises a channel disposed through an interior of said round bead;
said weed guard extends through said channel of said round bead; and
said round bead further comprises adhesive disposed within said channel of said round bead and around said weed guard; and
a ned worm, wherein at least a portion of said hook extends through at least a portion of said ned worm such that said hook end of said hook extends outside of said ned worm.

19. The fish hook assembly as claimed in claim 18, wherein said round bead is a spherical bead.

20. The fish hook assembly as claimed in claim 18, wherein said weed guard extends through said channel of said round bead no further than said bead surface of said round bead.

21. The fish hook assembly as claimed in claim 18, wherein said weed guard is a flat weed guard.

22. The fish hook assembly as claimed in claim 18, wherein:
said flatter portion of said substantially hemispherical head comprises a head diameter;
said round bead comprises a bead diameter; and
a ratio of said head diameter to said bead diameter is between 0.6:1 and 1:0.6.

23. The fish hook assembly as claimed in claim 18, wherein said weed guard extends from said rounded portion of said substantially hemispherical head.

24. The fish hook assembly as claimed in claim 18, further comprising fishing line sized to fit through said eye.

25. The fish hook assembly as claimed in claim 24, further comprising a fishing pole.

* * * * *